United States Patent Office 3,435,733
Patented Apr. 1, 1969

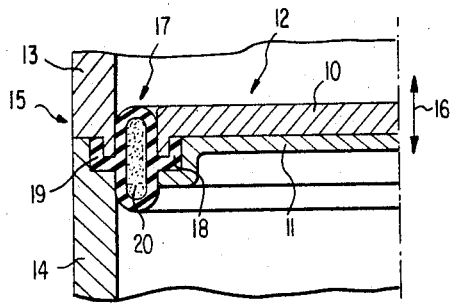
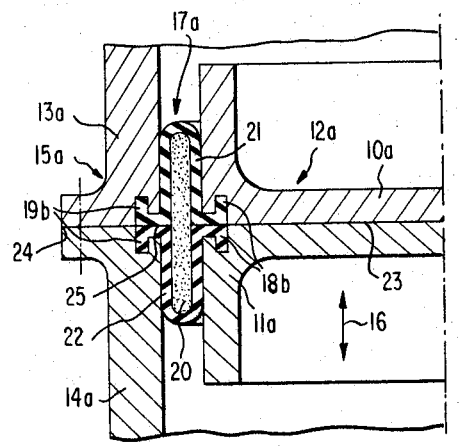
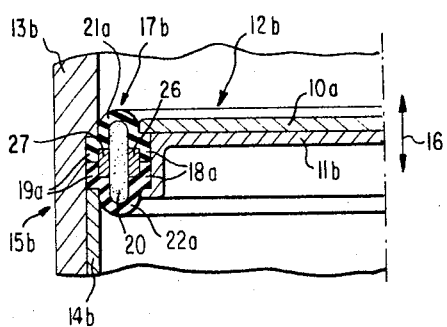
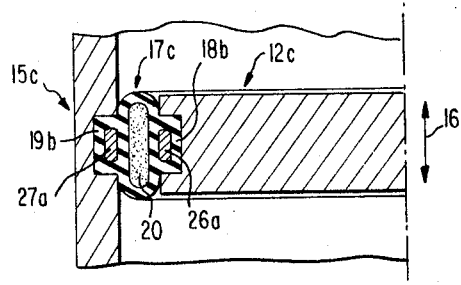
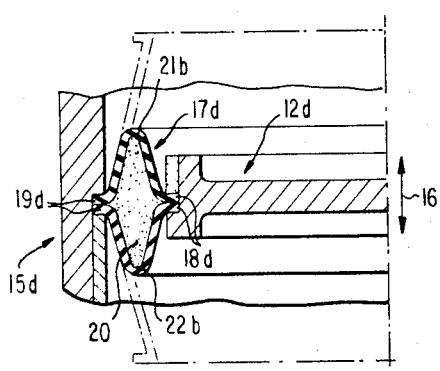

3,435,733
ELASTIC SEAL BETWEEN CYLINDER AND PISTON
Kurt Enke, Fellbach, Wurttemberg, Germany, assignor to Daimler-Benz Aktiengesellschaft, Stuttgart-Unterturkheim, Germany
Filed July 15, 1966, Ser. No. 565,597
Claims priority, application Germany, July 16, 1965, D 47,740
Int. Cl. F01b *19/02;* F16j *3/00;* F16f *5/00*
U.S. Cl. 92—97  2 Claims

ABSTRACT OF THE DISCLOSURE

The seal structure comprises a sealing member of elastic material having a body adapted to be secured on one hand at the inner circumference of the cylinder and on the other hand at the outer circumference of the piston. The body of the sealing member comprises a ring-shaped convex hollow body, and ring means of substantially rigid material are disposed on the hollow body about its circumference for centering and supporting the hollow body of the sealing member. The wall thickness of the ring-shaped hollow body is relatively slight and the hollow space thereof is filled with a substantially incompressible medium. The ring-shaped hollow body consists of two substantially symmetrical halves with the separating joint thereof extending radially to form the flange-like securing bead, and the ring of rigid material is comprised by a pair of circumferential rings arranged radially inwardly as well as radially outwardly of the hollow space within the hollow body.

---

The present invention relates to a seal between a cylinder and a piston, axially displaceable within the cylinder and adapted to be alternately actuated by pressure on both sides, especially a damping piston in regulators for motor-vehicle pneumatic-spring systems whereby the seal consists of an elastic material and is secured on the one hand, at the internal circumference of the cylinder and, on the other, at the external circumference of the piston.

The purpose of such seals resides in effecting a complete seal of the piston with respect to the cylinder while at the same time permitting an easy and uniform relative movemen of piston and cylinder in both axial directions.

Seals of the aforementioned type are known in the prior art which—in order to enable a certain freedom of movement of the piston with respect to the cylinder—are constructed turned inside out with a horseshoe-shaped cross section whereby each of the two arms of the horseshoe runs out into a flange-like bead which serves for securing the seal, on the one hand, at the piston, and on the other, at the cylinder wall. The disadvantage of this known, prior art seal now consists in that under pressure loads on the piston, the seal after an initial resistance is inverted toward the side in which is directed the pressure, i.e., is turned inside out in the direction of the pressure. This leads to an undesirable, jerk-like piston movement and therebeyond to a rapid wear of the seal.

The present invention is now concerned with the task to avoid the aforementioned disadvantages and therebeyond to achieve the advantages to be described hereinafter.

As a solution to the underlying problem, the present invention proposes that the seal body is constructed in the manner of an annularly shaped, convex hollow body.

Any suitable elastic material, for example, rubber, may serve as material for the hollow body which may possibly be provided further with a fabric insert. As a result of the construction of the seal in accordance with the present invention as a hollow body, the seal receives a shape which offers a stronger resistance to the deformations of the aforementioned type than the known seals with horseshoe-shaped cross section. Of course, the wall thickness may be selected so strong that a turning inside out of the seal is no longer possible even under maximal pressure conditions. However, it is also feasible to vary the wall thickness depending on the position and location of the strongest load and stress. Furthermore, an air or gas cushion possibly enclosed within the hollow space offers a resistance ot a turning inside out. However, the present invention permits simultaneously in an advantageous manner a uniform and easy displacement of the piston with respect to the cylinder whereby the hollow body is elastically deformed in the manner of a roller bellows.

The securing of the hollow body, on the one hand, at the cylinder, and, on the other, at the piston, may be achieved in any known manner. For example, a bonding or glueing of the hollow body between the corresponding parts would be possible. However, for reasons of good durability and tightness, the present invention proposes that the hollow body for purposes of its securing at the corresponding parts, is provided radially inwardly as well as radially outwardly thereof with flange-like beads and that these beads are disposed axially approximately in the center of the hollow body.

Of course, an eccentric arrangement of the beads is also possible and thus falls within the scope of the present invention if this is desirable for any constructive reasons. However, a central arrangement of the beads offers the advantage that during displacement of the piston within the cylinder, the walls of the hollow body are stretched uniformly.

The choice of the shape of the hollow body cross section, in every individual case, is left at the complete discretion of the designer. Thus, an approximately circular cross section would be feasible with an oval hollow body cross section elongated in the axial direction, which would mean an advantageous reinforcement of the lateral walls. However, the present invention proposes in contradistinction thereto that the annularly shaped hollow body has an oval cross section strongly elongated in the axial direction and a constant wall thickness.

The advantage of this construction according to the present invention resides in an increase in the resistance to an inverting, i.e., a turning inside out, whereby simultaneously owing ot the uniform wall thickness, also a uniform displacebility of the piston is assured. Furthermore, a good guidance of the piston within the cylinder is achieved advantageously by reason of the elongated and narrow construction of the seal cross section. The resistance of the seal against axial displacement of the piston in the cylinder depends far-reachingly on the ratio of wall thickness to the over-all dimensions of the seal. Thus, for example, with a slight wall thickness also a smaller resistance to displacement might be expected. However, a slight wall thickness has again an unfavorable effect as regards an eventual inverting, i.e., turning inside out of the seal. In order to exclude this danger with simultaneous easy displaceability of the piston, the present invention proposes that the wall thickness of the ring-shaped hollow body is relatively slight and that the hollow space is filled wih an incompressible medium.

Particularly suitable as incompressible medium would be, for example, a liquid whose friction is relatively slight with respect to the seal inner walls. Furthermore, a gelatinous-like mass would also be feasible or instead a solid, smooth body with low friction with respect to the elastic hollow body walls. The incompressible filling of the hollow body prevents with certainty a turning inside out thereof and acts in the manner of a roller body during the displacement of the piston. The incompressible medium may be vulcanized-in already during the manufacture of the seal or—with the use of a liquid—may be injected subsequently.

The hollow body itself may be made in one piece or may also be composed of several pieces. For the last-mentioned case, the present invention preferably proposes that the ring-shaped hollow body consists of two symmetrical halves and that the separating gap extends radially. The hollow body now is composed of two mirror-image-like partial pieces.

In connection with another construction the present invention proposes that the hollow body has a double conical cross section. Such a configuration of the hollow body advantageously favors a displacement of the piston whereby only a relatively slight resistance is opposed to the displacement by the hollow body. In this sense, it is particularly appropriate to manufacture, for example, by conventional molding method, the two simple conical sealing halves separately and in stretched form—as generated surfaces of a truncated cone—and to turn over only during the assembly so that the aforementioned conical cross section becomes a reality. Of course, it is recommended thereby for reasons already pointed out above also with this construction to provide the hollow body with a uniform wall thickness.

The joining of the two seal halves during the assembly may take place with both aforementioned constructions by means of vulcanizing, bonding, glueing, or the like, or also by compressing whereby appropriately the cylinder and the piston are provided with a separating joint corresponding to the seal so that each seal half is inserted into a corresponding cylinder and piston half and with the assembly of the cylinder and piston halves, simultaneously also a joining of the seal halves takes place. In order to assure an exact and accurate joining of the seal halves, especially with a relatively slight wall thickness thereof, the present invention additionally provides that for purposes of centering the two sealing ring halves within the hollow body—radially inwardly as well as outwardly—one ring each of rigid material is arranged within the hollow body, both radially inwardly as well as outwardly thereof.

The rings may, for example, be so inserted into corresponding annularly shaped groove-like apertures within the seal halves that they are completely surrounded by the material of the seal in the assembled condition. Furthermore, it is also possible within the scope of the present invention to insert the rings in such a manner that they form a portion of the inner wall of the hollow body. In addition to the purpose of centering and form-rigidity, the rings may also serve advantageously at the same time for purposes of securing the seal at the piston and cylinder so that the lateral flange-like securing beads of the seal have to be constructed only comparatively narrow.

Accordingly, it is an object of the present invention to provide an elastic seal between cylinder and piston of the type described above which eliminates, by simple means, the aforementioned shortcomings and drawbacks encountered in the prior art constructions.

It is another object of the present invention to provide an elastic seal between the cylinder and the piston of a regulator for a motor-vehicle pneumatic spring which assures a smooth and jerk-free operation during relative movements between piston and cylinder and opposes sufficient resistance to an inverting of the seal to assure completely satisfactory operation.

A further object of the present invention resides in an elastic seal between the cylinder and piston for use in regulators of pneumatic springs which minimizes wear in the seal, combined with a greater resistance to deformations caused by the pressure forces acting on the seal.

A still further object of the present invention resides in an elastic seal between the cylinder and piston of a control device used in pneumatic springs for vehicles which is elastically deformed in the manner of a roller bellows to assure uniform and easy displacement.

Another object of the present invention resides in an elastic seal of the type described above which can be easily installed and assembled, has good sealing properties and remains safely secured in the assembled and properly aligned postion.

These and further objects, features and advantages of the present invention will become more obvious from the following description when taken in connection with the accompanying drawing which shows, for purposes of illustration only, several embodiments in accordance with the present invention, and wherein:

FIGURES 1 to 5 are cross-sectional views through five different embodiments of an elastic seal in accordance with the present invention, only one-half of the piston and cylinder parts 13 and 14. The seal 17 constructed as ring-half being of mirror-image-like construction.

Referring now to the drawing wherein like reference numerals are used throughout the various views to desigi-nate like parts and more particularly to FIGURE 1, the embodiment illustrated therein includes a piston generally designated by reference numeral 12 and consisting of two parts 10 and 11 and a cylinder generally designated by reference numeral 15 and consisting of two parts 13 and 14, whereby the piston 12 is arranged axially displaceably within the cylinder 15 as indicated by the double arrow 16. The sealing of the piston 12 with respect to the cylinder 15 takes place by means of a ring-shaped seal generally designated by reference numeral 17 and constructed as hollow body which is provided radially outwardly as well as radially inwardly thereof in the center with flange-like, rectangularly bent beads 18 and 19. The beads 18 and 19 serve for securing the seal 17 at the piston 12 and at the sylinder parts 13 and 14. The seal 17 constructed as ring-cylinder 15, respectively, and for this purpose are clamped between the piston parts 11 and 10 and the shaped hollow body is of unitary construction and has an axially elongated or stretched, oval form as well as uniform, relatively slight wall thickness. The slight wall thickness enables advantageously an easy axial displaceability of the piston 12 whereby the elastic hollow body of the seal 17 carries out a rolling movement. In order to prevent an inverting, i.e., a turning inside out of the hollow body under the influence of pressure, the hollow body is filled with an incompressible liquid 20 which has only a very slight friction with respect to the inner walls of the hollow body and acts simultaneously as rolled body during the displacement of the piston.

In the embodiment according to FIGURE 2, the seal generally designated by reference numeral 17a consists of two mirror-image-like halves 21 and 22 which are arranged in coordinated piston and cylinder parts 10a, 13a and 11a, 14a respectively. The radially directed separting joints 23 and 24 of piston 12a and cylinder 15a are in one and the same plane with the separating joint 25 of the seal and the joining of the two seal halves 21 and 22 takes place simultaneously with the assembly of the corresponding piston and cylinder halves 10a, 11a and 13a, 14a, respectively. The separating surfaces of the seal halves 21 and 22 which may appropriately project axially slightly beyond the separating surfaces of the piston and cylinder parts 10a and 11a, and 13a, 14a can be rigidly clamped against one another so that the enclosed liquid 20 cannot escape. The liquid filling 20 is appropriately injected after assembly of the seal 17a.

In the embodiment according to FIGURE 3, the seal generally designated by reference numeral 17b also consists of two mirror-image-like halves 21a and 22a. The piston generally designated by reference numeral 12b and the cylinder generally designated by reference numeral 15b each consists of two parts 10b, 11b, and 13b, 14b, respectively. However, in this construction the separating joints of the parts 12b, 15b, and 17b are not in one and the same plane. For purposes of centering the two seal halves 21a and 22a as well as for purposes of securing the seal 17b at the piston 12b and at the cylinder 15b, two rings 26 and 27 of rigid material are provided which engage into corresponding ring-shaped apertures in the seal halves 21a and 22a and form at the same time a part of the seal hollow body. By reason of the effect of the rings 26 and 27 as securing elements, the flange-like beads 18a and 19a are constructed in this embodiment relatively narrow.

In the embodiment according to FIGURE 4 the seal 17c, the piston 12c and the cylinder 15c are each constructed in one piece, i.e., are each of unitary construction. Rigid rings 26a and 27a are vulcanized into the two flange-like beads 18b and 19b which serve for purposes of securing the beads 18b and 19b.

The seal 17c is appropriately inserted at first with the beads 18b and 19b into the corresponding annularly shaped groove-like apertures provided in the piston 12c and cylinder 15c and is subsequently filled with liquid, for example, by injection. As a result thereof, a secure seating of the seal 17c in the piston 12c and in the cylinder 15c can be achieved with simultaneous relatively narrow construction of the beads 18b and 19b.

In the embodiment according to FIGURE 5, both seal halves 21b and 22b are of conical construction in cross section so that the hollow body 17d composed of the two halves has a double conical shape. The outlines shown in FIGURE 5 in dash and dot lines represent in each case the manufacturing shape of the seal halves 21b and 22b as generated surfaces of truncated cones. During the assembly, the latter are then turned over inwardly and thus receive the conical cross section thereof. The cylinder is generally designated in this embodiment by reference numeral 15d and the piston by reference numeral 12d while the securing beads are designated by reference numerals 18d and 19d.

While I have shown and described several embodiments in accordance with the present invention it is understood that the same is not limited thereto but is susceptible of numerous changes and modifications as known to a person skilled in the art and I therefore do not wish to be limited to the details shown and described herein but intend to cover all such changes and modifications as are encompassed by the scope of the appended claims.

I claim:
1. A seal structure for a damping piston and cylinder, said seal structure comprising a ring-shaped convex hollow body of elastic material having a wall defining a central hollow space, said body having an oval cross section strongly elongated in the axial direction and a substantially constant wall thickness, said body further including external flange-like securing bead means respectively extending radially inward and radially outward from opposite sides of said body and disposed axially substantially in the center of the hollow body, a pair of annular rings of substantially rigid material concentrically arranged respectively radially inwardly and radially outwardly of said central hollow space and entirely within the hollow body and each defining a portion of the wall defining said central hollow space, and a substantially incompressible fluid medium disposed within the central hollow space defined in part by the concentrically arranged annular rings.

2. A seal structure according to claim 1, wheren said ring-shaped hollow body consists of two substantially symmetrical halves with the separating joint thereof forming said flange-like securing bead means extending substantially radially inward and radially outward.

References Cited

UNITED STATES PATENTS

| | | | |
|---|---|---|---|
| 2,577,613 | 12/1951 | Friberg | 92—48 X |
| 2,751,850 | 6/1956 | Hoover | 92—100 X |
| 2,757,542 | 8/1956 | Klinger | 74—18.2 |
| 2,843,151 | 7/1958 | Greenawalt | 92—98 X |
| 2,929,216 | 3/1960 | Stelzer. | |
| 3,060,754 | 10/1962 | Klinger | 74—18.2 |
| 3,078,085 | 2/1963 | Bank. | |
| 3,113,592 | 12/1963 | Mercier | 92—98 X |
| 3,257,107 | 6/1966 | Nishioka et al. | |
| 3,339,464 | 9/1967 | Rietdijk | 92—98 |

FOREIGN PATENTS

| | | |
|---|---|---|
| 456,103 | 2/1928 | Germany. |

MARTIN P. SCHWADRON, *Primary Examiner.*
IRWIN C. COHEN, *Assistant Examiner.*

U.S. Cl. X.R.
74—18.2; 92—98, 99, 100; 267—65